(12) United States Patent
An et al.

(10) Patent No.: US 7,859,158 B2
(45) Date of Patent: Dec. 28, 2010

(54) CONNECTION STRUCTURE AND METHOD OF CONNECTING FIELD COIL AND LEAD WIRES IN VEHICLE ALTERNATOR

(75) Inventors: Sang-Chul An, Daegu (KR); Il-Woo Ha, Daegu (KR); Jae Pio You, Daegu (KR)

(73) Assignee: Korea Delphi Automotive Systems Corporation, Daegu (KR)

( * ) Notice: Subject to any disclaimer, the term of this patent is extended or adjusted under 35 U.S.C. 154(b) by 178 days.

(21) Appl. No.: 12/179,661

(22) Filed: Jul. 25, 2008

(65) Prior Publication Data

US 2009/0026854 A1    Jan. 29, 2009

(30) Foreign Application Priority Data

Jul. 27, 2007    (KR) ...................... 10-2007-0075510

(51) Int. Cl.
*H02K 13/02* (2006.01)
(52) U.S. Cl. ........................................... 310/91; 310/71
(58) Field of Classification Search .................. 310/43, 310/71, 91, 231, 234, 235, 263
See application file for complete search history.

(56) References Cited

U.S. PATENT DOCUMENTS

| | | | | |
|---|---|---|---|---|
| 3,271,604 A | * | 9/1966 | Priddy | 310/234 |
| 3,603,825 A | * | 9/1971 | Sheridan et al. | 310/194 |
| 4,588,911 A | * | 5/1986 | Gold | 310/62 |
| 5,254,896 A | * | 10/1993 | Bradfield et al. | 310/263 |
| 5,329,199 A | * | 7/1994 | Yockey et al. | 310/263 |
| 5,625,244 A | * | 4/1997 | Bradfield | 310/232 |
| 5,886,451 A | * | 3/1999 | Hatsios et al. | 310/263 |
| 6,369,471 B1 | * | 4/2002 | Whitted et al. | 310/62 |

FOREIGN PATENT DOCUMENTS

| | | |
|---|---|---|
| JP | 59-204445 | 11/1984 |
| JP | 82-05496 | 8/1996 |
| KR | 97-55080 | 7/1997 |
| KR | 20-0355798 | 7/2004 |

* cited by examiner

*Primary Examiner*—Tran N Nguyen
(74) *Attorney, Agent, or Firm*—Bachman & LaPointe, P.C.

(57) ABSTRACT

A connection structure and a connection method of connecting field coils and lead wires in a vehicle alternator. The connection structure includes a rotor assembly, a rear fan, and a rotor insulator. The rotor assembly includes a rotor shaft, a spool bobbin, and rotor segments. In the connection structure, a soldering or welding process is performed on twisted parts, which are formed by twisting field coils and lead wires around each other, the twisted parts are bent in the guide pockets of the rotor insulator, epoxy is applied to the outer surfaces of the twisted parts and the inner surfaces of guide pockets, and the rear fan is coupled to the front of the rotor insulator so that the inner surfaces of the protrusion hubs of the rear fan are in close contact with the guide pockets of the rotor insulator.

6 Claims, 15 Drawing Sheets

CONNECTION STRUCTURE AND METHOD OF CONNECTING FIELD COIL AND LEAD WIRES IN VEHICLE ALTERNATOR

BACKGROUND OF THE INVENTION

1. Field of the Invention

The present invention relates generally to a vehicle alternator and, more particularly, to a connection structure and a method of connecting field coils and lead wires in a vehicle alternator, in which an electrical connection structure between the lead wires of a slip ring and the field coils of a rotor assembly is achieved by performing epoxy curing in the space between hubs, which protrude from the front surface of a rear fan, and guide pockets, so that a work process is simplified and, thus, costs can be reduced because the process of assembling an insulator tube with the field coil is eliminated and, in addition, a defect rate attributable to the simplification of the work process can be minimized because a welding process, a soldering process, a bending process and an epoxy coating process are performed on twisted parts, which are formed on the field coils and the lead wires in the guide pockets of a rotor insulator without interfering with neighboring protrusions.

2. Description of the Related Art

Generally, a vehicle alternator is one of the electrical parts for a vehicle engine. In order to increase the generated voltage at low speed and to maintain stable performance at high speed, a typical three-phase alternator, which is called an 'alternator,' is used.

Such a three-phase alternator for vehicles, which is connected to an engine via a belt, enables a rectifier to convert Alternating Current (AC) electricity, which is generated by a stator assembly when a rotor assembly is in an excited state, into Direct Current (DC) electricity, and functions to recharge a discharged battery with power and to supply current, which is necessary to operate other electrical parts, thereto, while supporting various electrical loads on a vehicle.

Here, the rotor assembly is provided with an exciting coil and a slip ring on a shaft in order to form an electromagnetic field caused by exciting current, and receives both the impact and the vibration, which occur due to the traveling of a vehicle, in the state in which it is rotated by the driving force of an engine, and thus the durability thereof is most important.

FIG. 1 is a sectional view showing a conventional vehicle alternator, FIG. 2 is a view showing the rear fan of the conventional vehicle alternator, and FIG. 3 is a view schematically showing the connection structure between the rear fan and a wire in the conventional vehicle alternator.

As shown in FIG. 1, the conventional vehicle alternator 100 is configured such that a stator assembly 114, which includes a stator core 112 and a stator coil 113, is pressed between a front housing 111 and a rear housing 110 and is fitted thereinto. Furthermore, a rotor shaft 116, which is supported by bearings 115, which are pressed and fitted into the front housing 111 and the rear housing 110, is provided inside from the stator assembly 114.

A spool bobbin 119, to which a rotor coil 117 is wound, is pressed and fitted into the middle portion of the rotor shaft 116, and rotor segments 122, having a plurality of rotor poles 120 arranged in the direction of the shaft, are coupled to each other to contain the spool bobbin 119 outside the spool bobbin 119, and thus a rotor assembly 124 is completed.

That is, the rotor assembly 124 includes the rotor coil 117, the rotor segments 122 and the spool bobbin 119, which are disposed around the rotor shaft 116, and a rear fan 130, which is provided in the rear.

Furthermore, a voltage regulator, which is used to maintain the voltage generated from the rotor assembly 124 and the stator assembly 114 constant, and a rectifier 126, which is used to convert AC electricity into DC electricity, are mounted outside the slip ring 118 of the rotor assembly 124.

Furthermore, the Slip Ring End (SRE) of the rotor shaft 116 is located so as to pass through the rear fan 130. One or more coil incoming holes 132 for bringing field coils 117a, which extend from the rotor coil 117, thereinto are formed at proper positions in the rear fan 130.

Here, each of twisted parts 137 is formed by pulling out both a lead wire 118a of the slip ring 118 and a field coil 117a of the rotor coil 117 through the rear fan 130 and then twisting the lead wire 118a and the field coil 117a around each other. Bonding portions 139, which are formed by welding, are formed on the twisted parts 137.

Meanwhile, the rear fan 130 is called a 'cooling fan.' The coil incoming holes 132 for bringing the field coil 117a of the rotor coil 117 thereinto are formed in respective proper positions on the rear surface thereof, and coil guide grooves 133 for guiding the respective field coils 117a are formed in respective proper positions on the front surface thereof to have a predetermined length in the central direction of the rear fan 130.

As described above, the lead wires 118a of the slip ring 118, which are bent at the entrance of the coupling hole 131 of the rear fan 130 and are mounted in the front, and the field coils 117a of the rotor coil 117, which are brought into the front of the rear fan 130 through the coil incoming hole 132 and are seated in the respective coil guide grooves 133, are connected to respectively correspond to each other.

In this case, in order to connect the lead wires 118a of the slip ring 118 and the field coils 117a of the rotor coil 117 to respectively correspond to each other, ultrasonic welding is performed after twisting or tig welding.

However, there are problems in that an electrical short circuit may occur in the vehicle alternator 100 due to the impact that is transmitted to the lead wires 118a by the vibration, which occurs due to the ultrasonic welding, which cause a lead wire 118a to be released and to come into contact with the 115, and in that, when the alternator 100 is rotated at high speed during the travel of a vehicle, a defect, such as a short circuit, which occurs in the alternator 100 due to disconnection of the lead wires 118a, may occur.

Furthermore, there is a problem in that it is difficult to manage the quality of a product in an early stage because the structure of fastening the lead wires 118a and the field coils 117a by ultrasonic welding is formed such that whether the lead wires 118a are disconnected cannot be determined from the outside.

Furthermore, parts of the field coils 117a of the rotor coil 117 are exposed outside from the rotor assembly 130, so that oxidation may occur due to corrosion. Each of the field coils 117a has a structure in which the outer surface of a wire, which is a conductor, is surrounded by a plastic insulator tube, which is a nonconductor. In this case, it is difficult to automate the assembly process of covering wires with insulator tubes, and it is also very difficult to assemble a field coil 117a in each insulator tube while maintaining accurate dimensions.

In addition, if movement of the field coils 117a in such insulator tubes is not completely prevented, it may become a potential defect at high speeds. In the case where a soldering process is used to electrically connect the lead wires 118a and the field coils 117a to each other, solder flows into each insulator tube due to the capillary phenomenon in the insulator tube, so that the insulator tube may be hardened or degraded and, in addition, the insulator tube may be degraded when tig welding or ultrasonic welding is performed.

SUMMARY OF THE INVENTION

Accordingly, the present invention has been made keeping in mind the above problems occurring in the prior art, and the present invention is directed to provide a new conceptual connection structure and a method of connecting field coils and lead wires in a vehicle alternator, which can solve the conventional problem in which ultrasonic welding, which is used to fasten the lead wires of a slip ring and the field coils of a rotor coil, which are connected to respectively correspond to each other, causes lead wires to be released, thus making it difficult to observe whether the lead wires are disconnected.

Furthermore, the present invention is directed to provide a connection structure between field coils and lead wires and a connection method thereof, in which a structure of the field coils of the rotor coil is not exposed outside of an assembly, thus solving the conventional problem of corrosion of the field coils.

The present invention provides a connection structure between field coils and lead wires in a vehicle alternator, including: a rotor assembly, comprising: a rotor shaft, which is configured such that a slip ring is coupled to the outer circumferential surface of one end thereof and is provided with two guide grooves, which are formed in the outer circumferential surface in the longitudinal direction of the rotor shaft to be opposite each other and to have a predetermined depth, in order to enable lead wires, which are connected with the slip ring, to be seated and coupled thereto; a spool bobbin, which is wound by a rotor coil and is pressed and fitted into the middle portion of the rotor shaft; and rotor segments, each having a plurality of rotor poles 20 arranged in an axial direction, which are coupled to each other outside the spool bobbin to contain the spool bobbin;

a rear fan provided with a through-hole for connecting the rotor shaft, two protrusion hubs, having a rectangular shape, which are formed to have a predetermined length so as to be opposite each other around the through-hole, wherein a hollow is formed in each of the protrusion hubs; and a rotor insulator configured such that a rear fan support, having a doughnut shape, is formed in the central portion thereof so as to be coupled to the protrusion hubs downstream of the rear fan, a through-hole for connecting the rotor shaft is formed in the central portion of the rear fan support, coupling parts are integrally formed so as to extend a predetermined length from respective side portions of the rear fan support, second slots for coupling the field coils are formed in respective first ends of the coupling parts, 'ㄷ' shaped guide pockets, which protrude to a predetermined height, are integrally formed on the coupling parts, and first slots for coupling the field coils, which are coupled to the second slots, are formed in respective first edge portions of the guide pockets;

wherein a soldering or welding process is performed on twisted parts, which are formed by twisting the field coils and the lead wires around each other, the twisted parts are bent in the guide pockets of the rotor insulator, epoxy is applied to the outer surfaces of the twisted parts and the inner surfaces of the guide pockets, and the rear fan is coupled to the front of the rotor insulator so that the inner surfaces of the protrusion hubs of the rear fan are in close contact with the guide pockets of the rotor insulator.

Furthermore, the through-hole in the rear fan and the through hole in the rear fan support have identical diameters.

Furthermore, the rotor insulator may include rotation preventing parts, having a predetermined height, which are formed to protrude downwards from respective ends of the coupling parts to prevent the rotor insulator from rotating between the plurality of rotor poles.

The connection structure may further include tapered assembly depressions formed such that the lead wires can be seated and assembled in the respective inner surfaces of the protrusion hubs of the rear fan.

The connection structure may further include curved coupling depressions formed such that the field coils are seated and assembled in the protrusion hubs of the rear fan.

The connection structure may further include a plurality of protrusions formed on each of the inner surfaces of the protrusion hubs of the rear fan.

In addition, the present invention provides a method of connecting field coils and lead wires in a vehicle alternator, comprising the steps of:

mounting a rotor insulator to be coupled with a rotor shaft, which passes therethrough, and to be in close contact with the upper portions of rotor segments of a rotor assembly, locating field coils, which extend from a rotor coil and have a sufficient length, in an axial direction, and locating lead wires, which are connected to a slip ring coupled to the upper end of a rotor shaft, parallel to the field coils, which are longer than the lead wires;

bringing the field coils into contact with the respective lead wires and aligning the field coils and the lead wires;

forming twisted parts by twisting the field coils and the lead wire around each other, that is, using a twisting process, appropriately cutting the twisted parts to have lengths such that ends of the twisted parts can be contained in respective guide pockets of the rotor insulator, and performing a soldering process or a welding process on the outer surfaces of the twisted parts;

putting the twisted parts in the guide pockets of the rotor insulator and fastening the twisted parts thereto through a bending process;

applying an epoxy coating process to the guide pockets so that the outer surfaces of the twisted parts, on which the soldering process is performed, and the inner surfaces of the guide pockets are coated with epoxy; and performing assembly in such a way as to bring a rear fan into close contact with the upper portion of the rotor insulator before the epoxy, which is applied to the inner surfaces of the guide pockets and the outer surfaces of the twisted parts, is hardened.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention are described in detail with reference to the accompanying drawings below.

Figure 1:
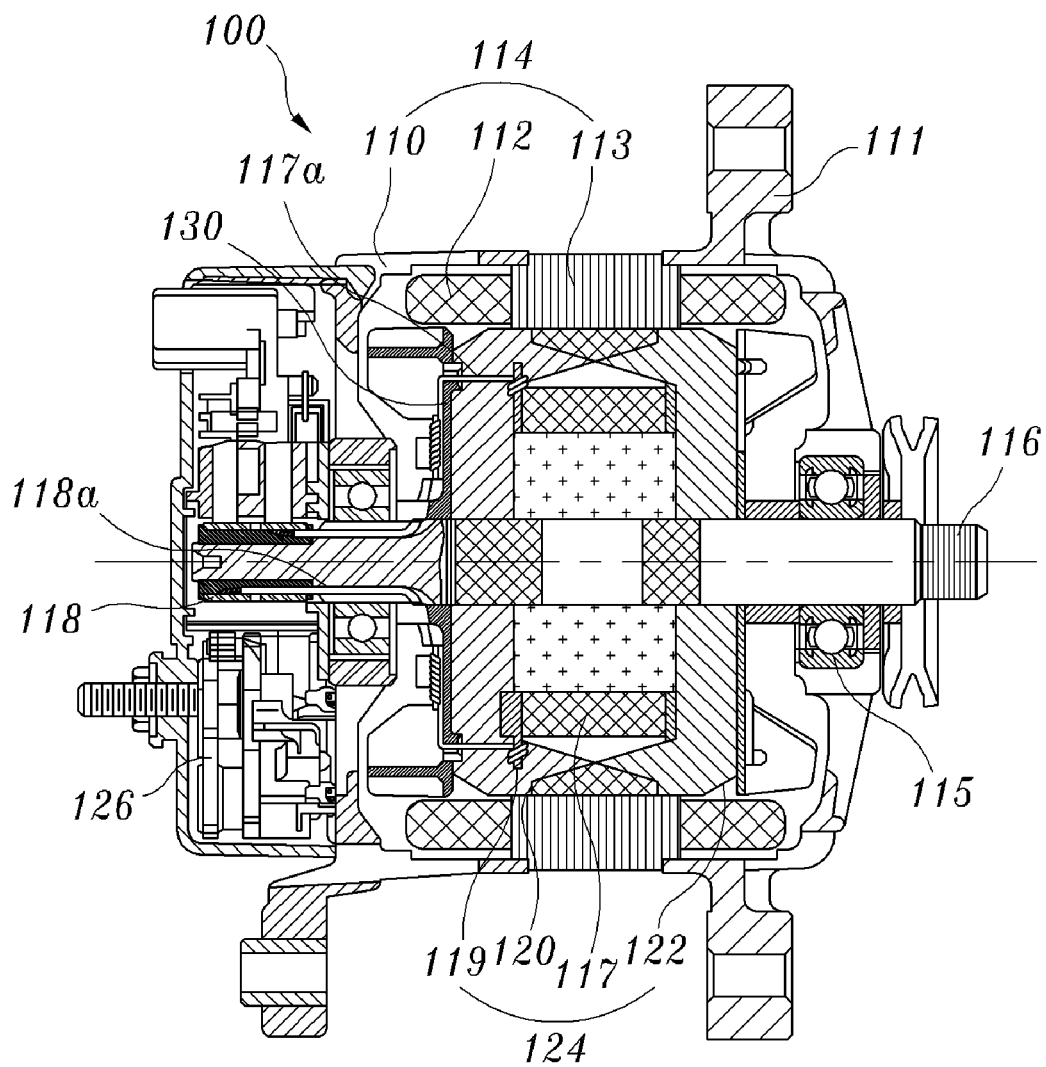
FIG. 1 is a sectional view showing a conventional vehicle alternator.
Figure 2:
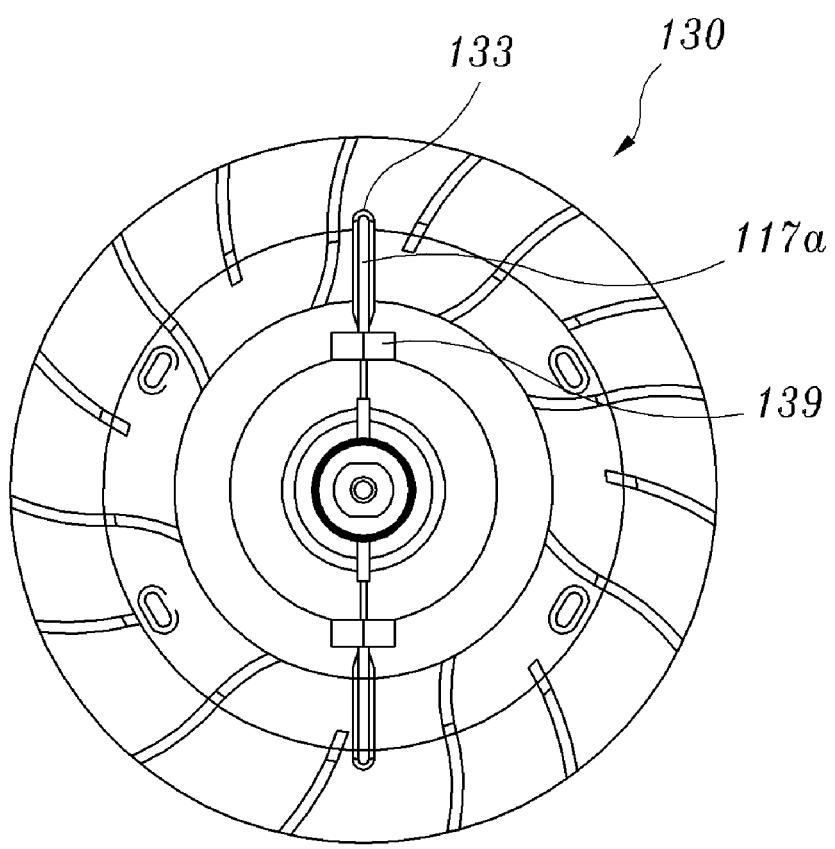
FIG. 2 is a view showing the rear fan of the conventional vehicle alternator.
Figure 3:
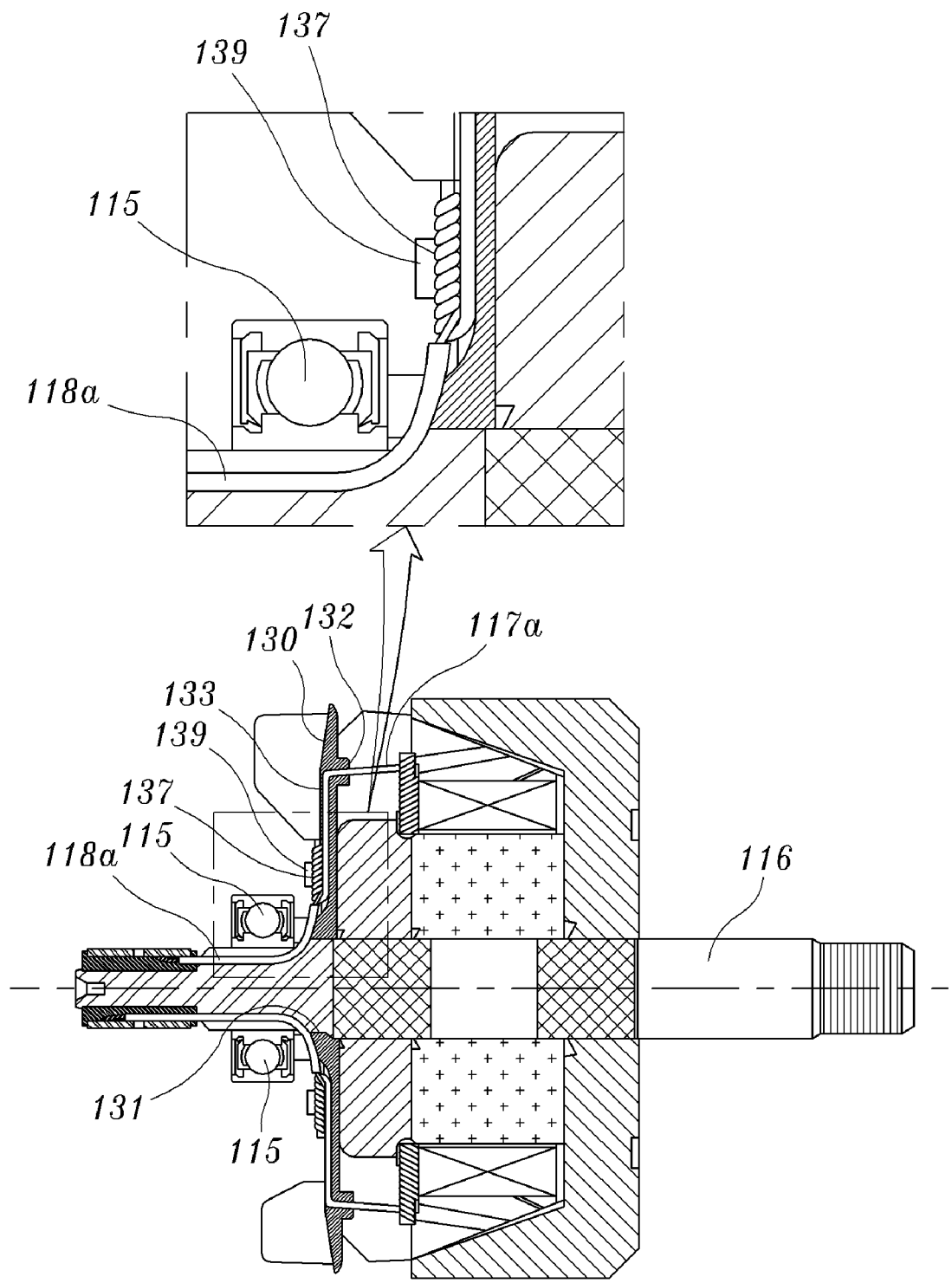
FIG. 3 is a view schematically showing a connection structure between field coils and lead wires in the conventional vehicle alternator.
Figure 4:
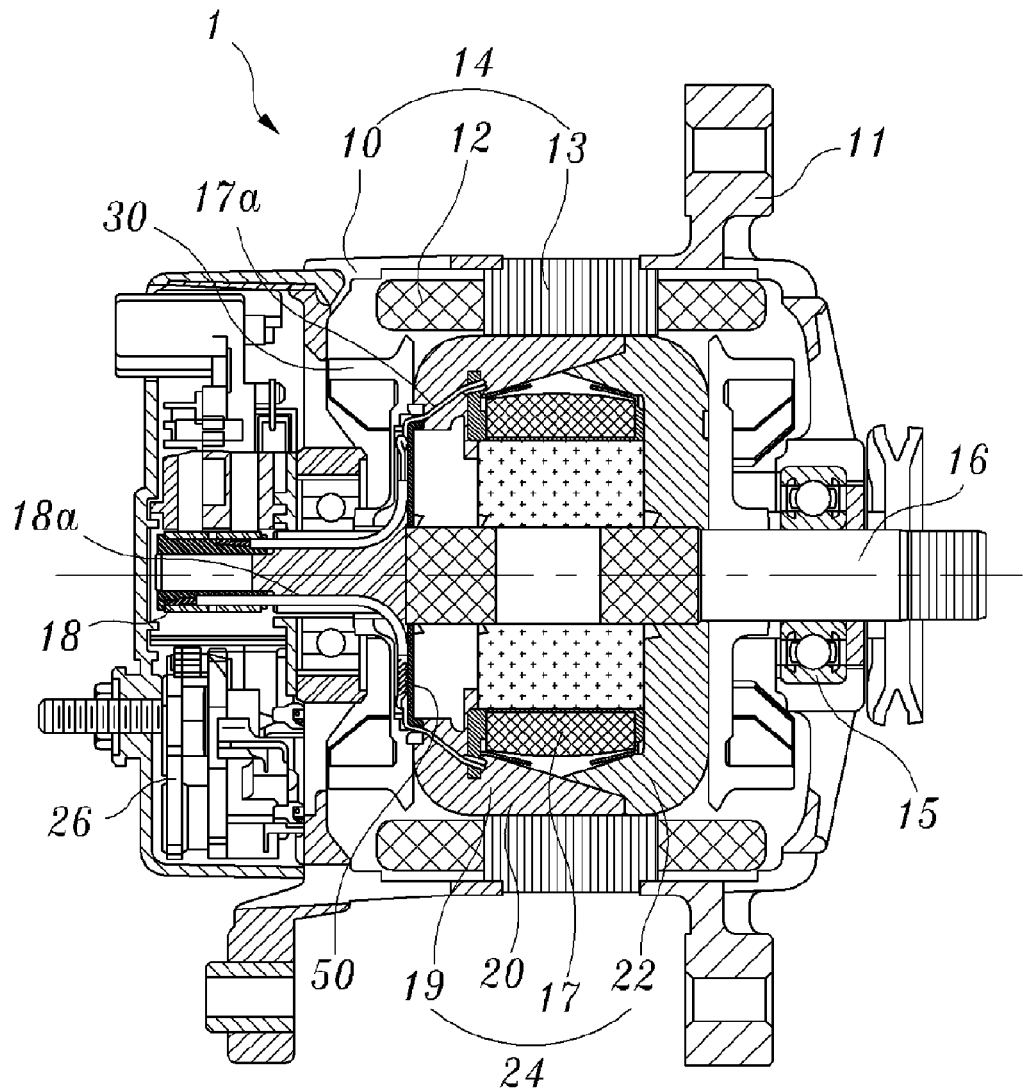
FIG. 4 is a sectional view schematically showing a vehicle alternator according to an embodiment of the present invention.
Figure 5:
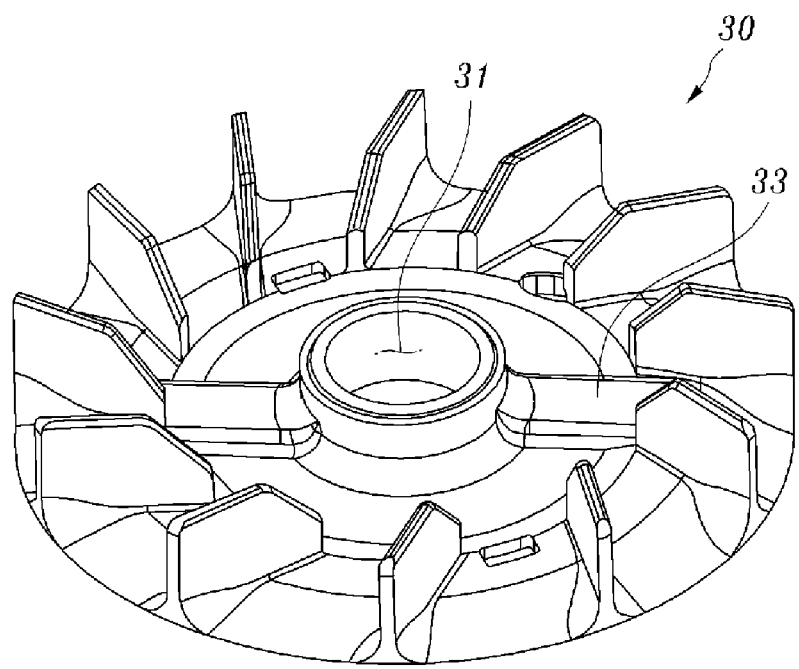
FIG. 5 is a front perspective view schematically showing a rear fan according to an embodiment of the present invention.
Figure 6:
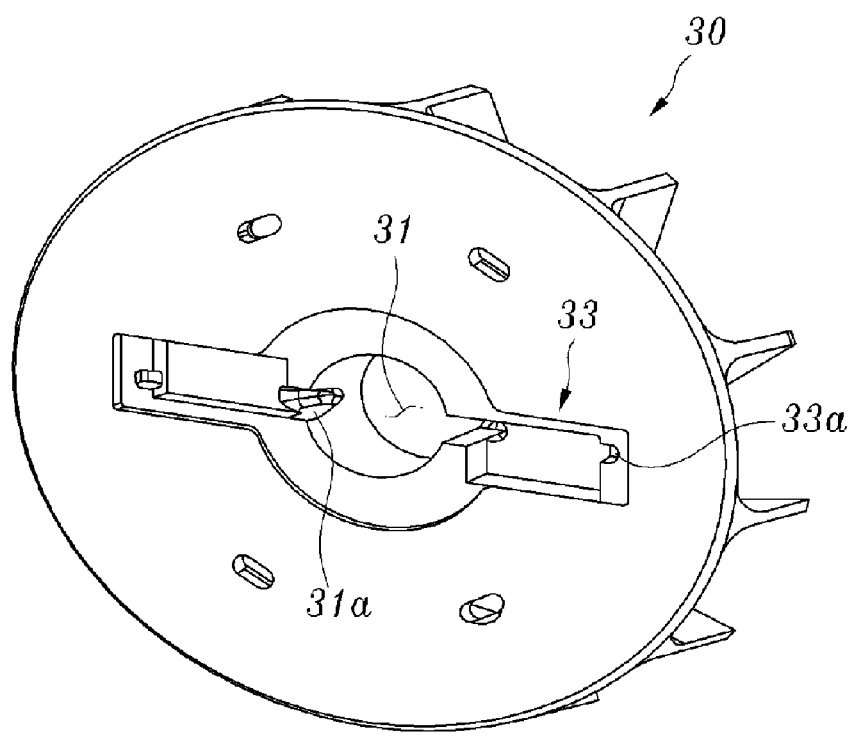
FIG. 6 is a rear perspective view schematically showing the rear fan according to the embodiment of the present invention.
Figure 7:
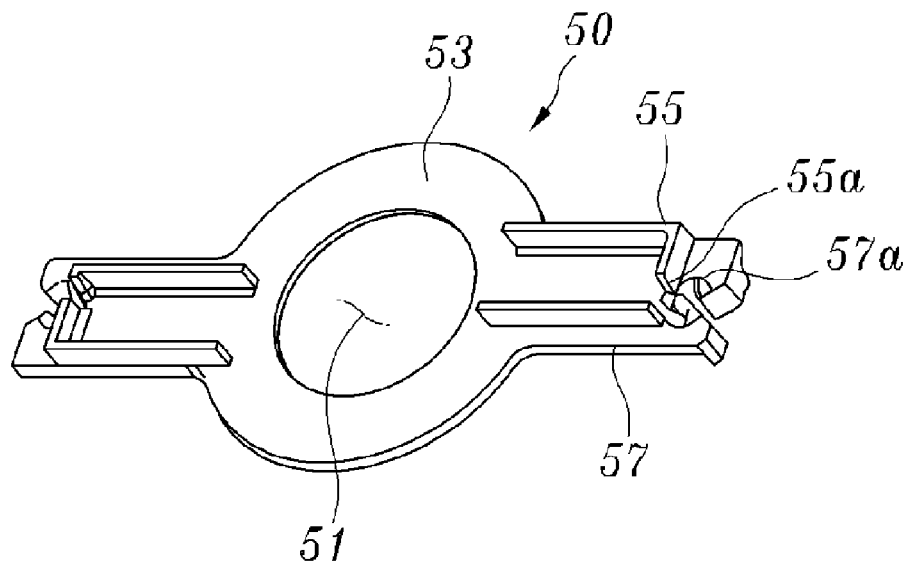
FIG. 7 is a front perspective view schematically showing a rotor insulator according to an embodiment of the present invention.
Figure 8:
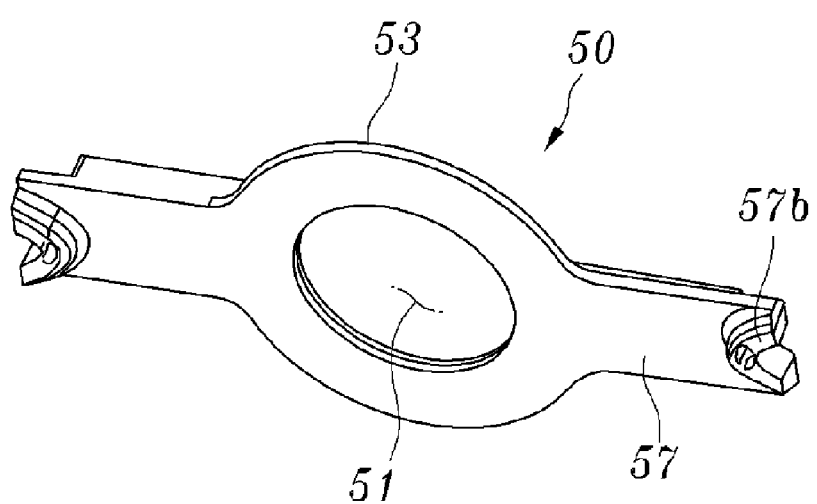
FIG. 8 is a rear perspective view schematically showing the rotor insulator according to the embodiment of the present invention.
Figure 9:
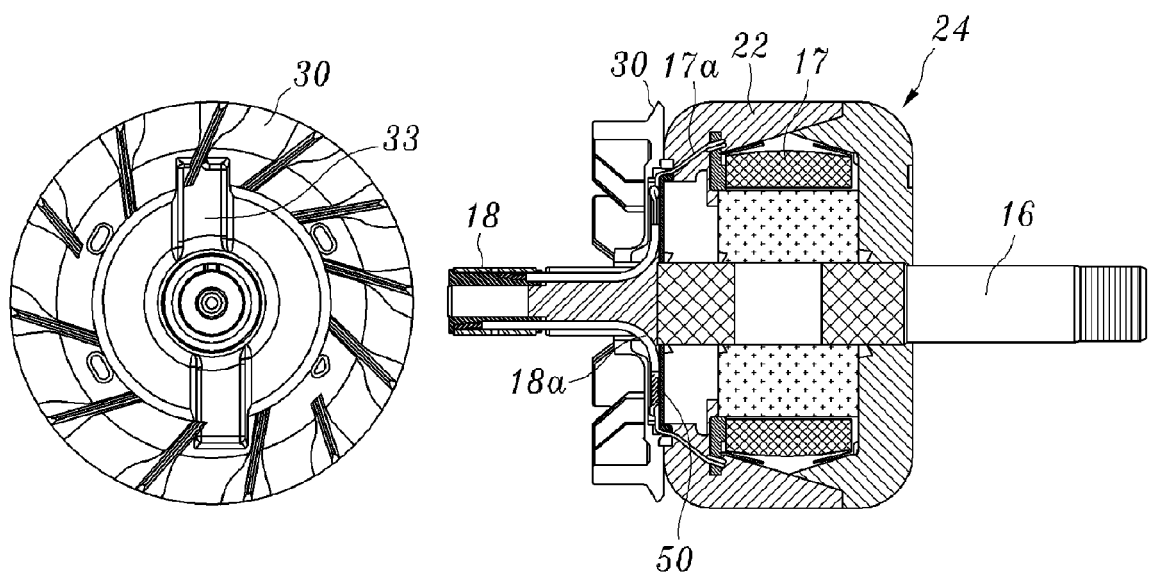
FIG. 9 is a side sectional view and a front view of a rotor assembly, to which a connection structure between field coils and lead wires according to an embodiment of the present invention is applied.
Figure 10A:
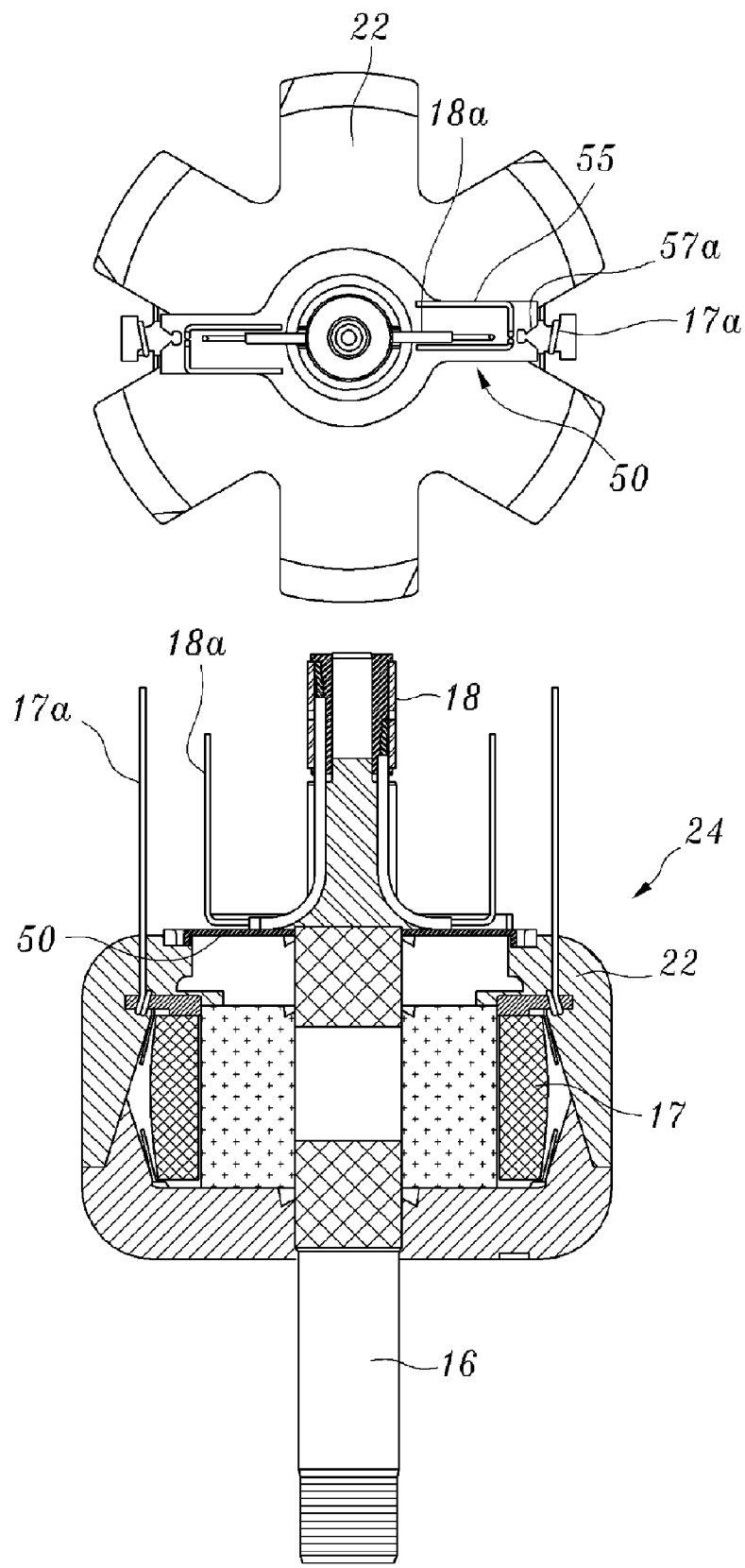
FIGS. 10A to 10F are side sectional views and a front view of a rotor assembly, which is used to schematically illustrate a method of connecting field coils and lead wires according to an embodiment of the present invention.
Figure 10B:
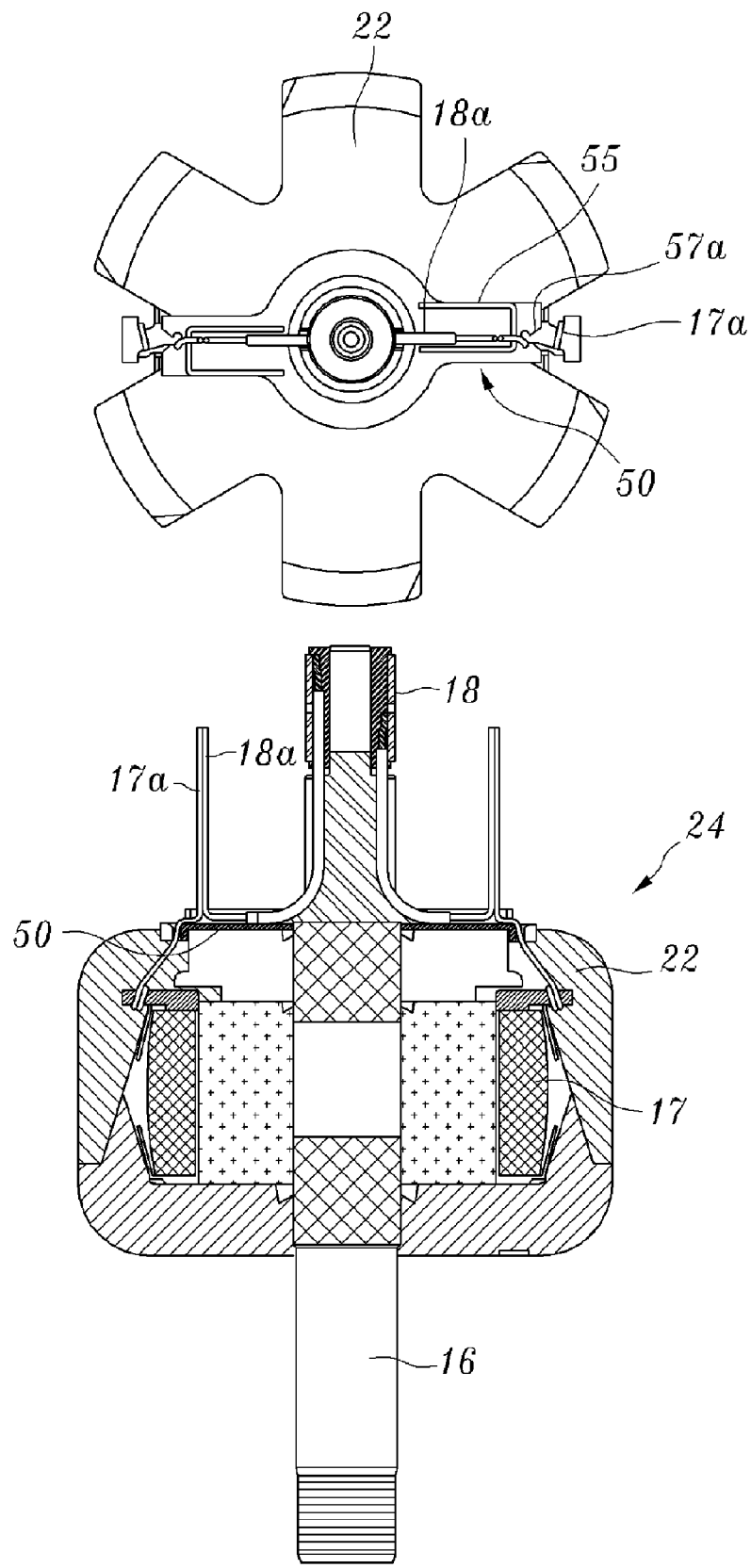
Figure 10C:
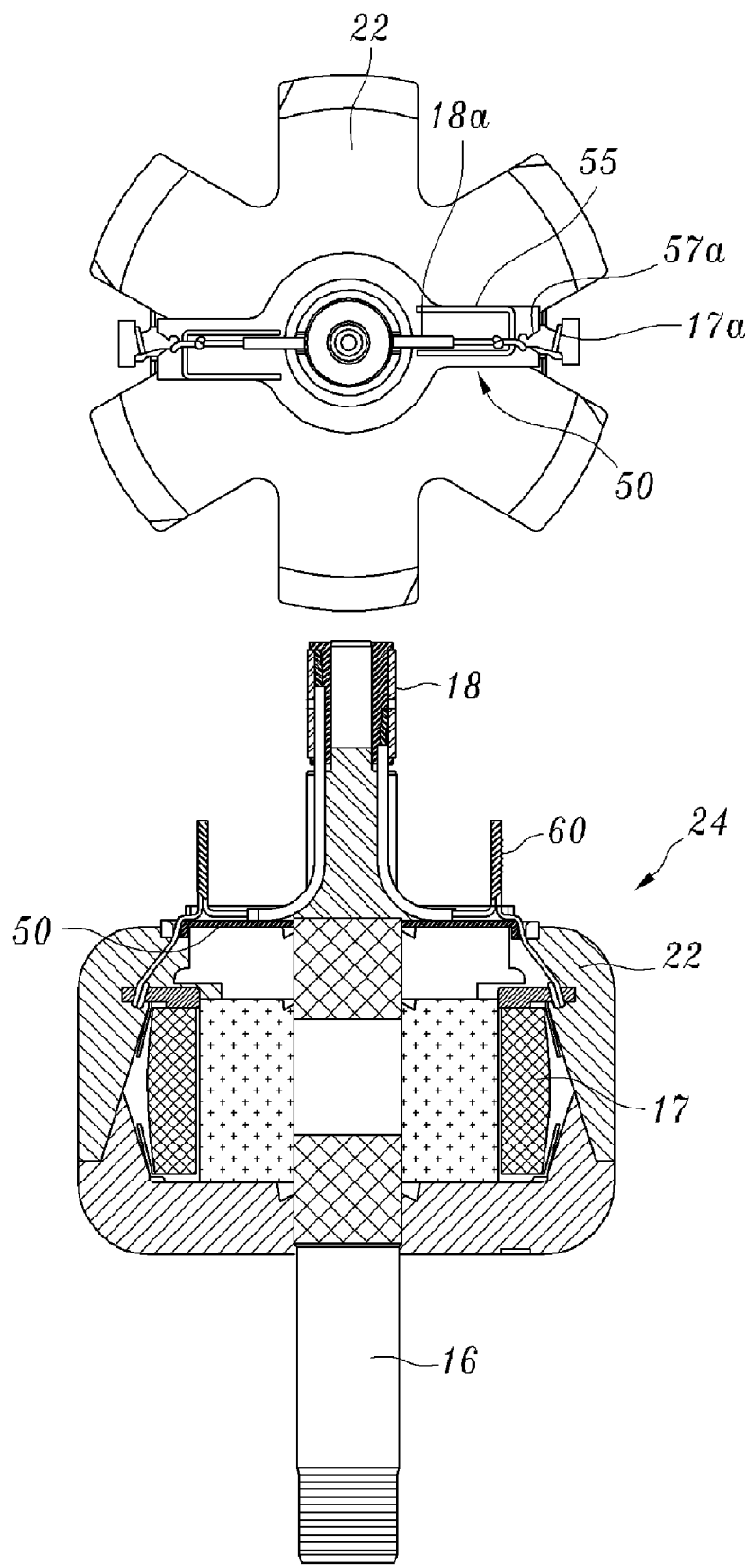
Figure 10D:
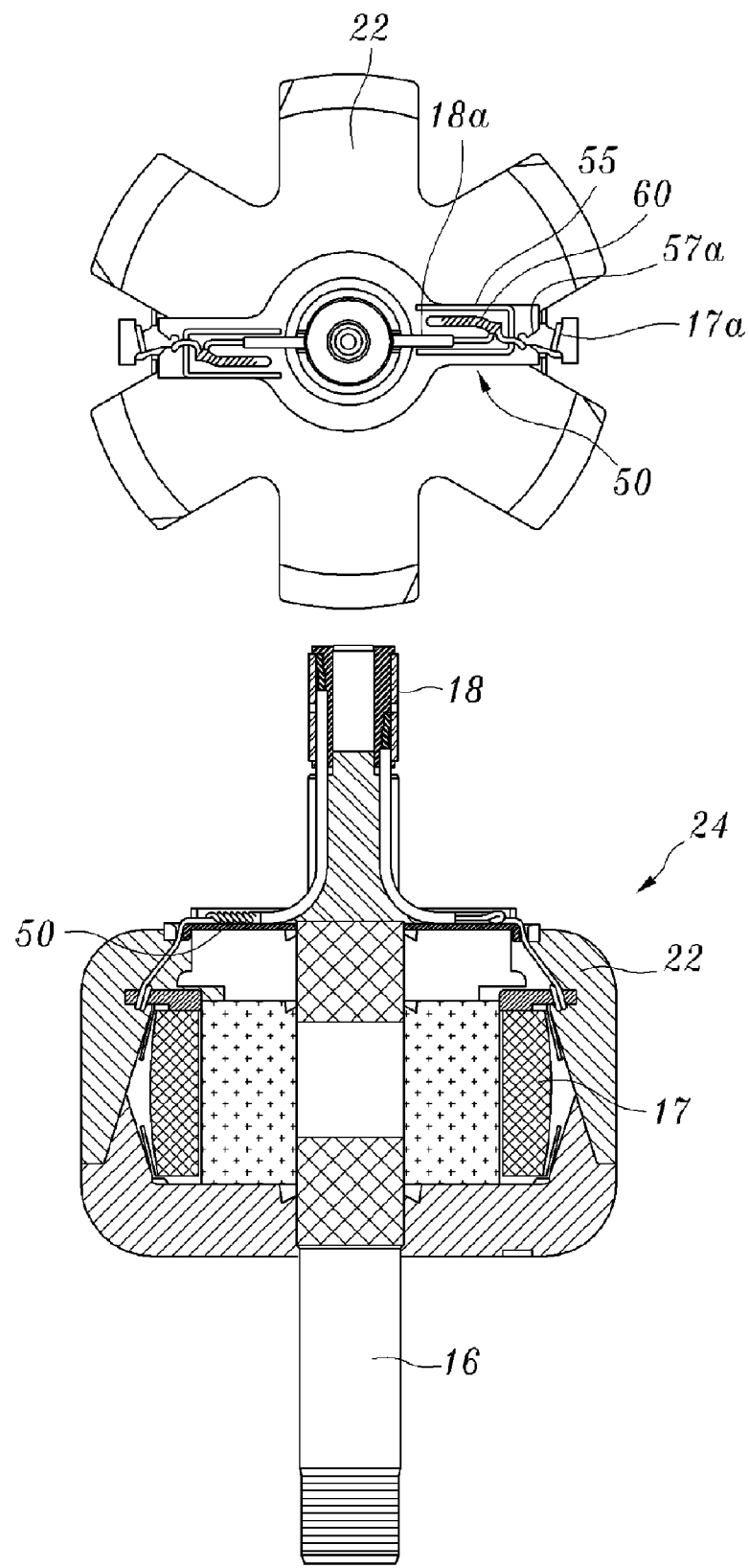
Figure 10E:
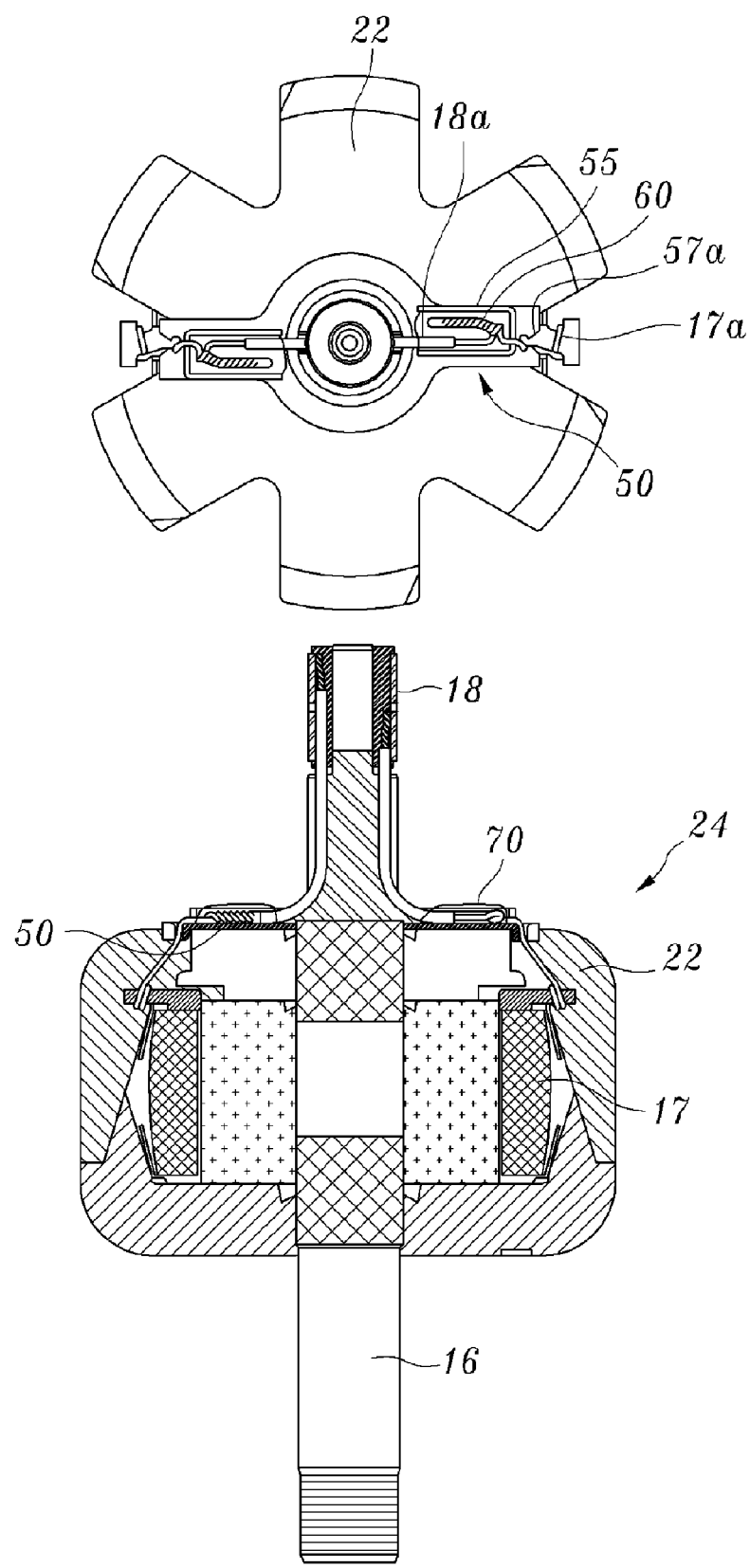
Figure 10F:
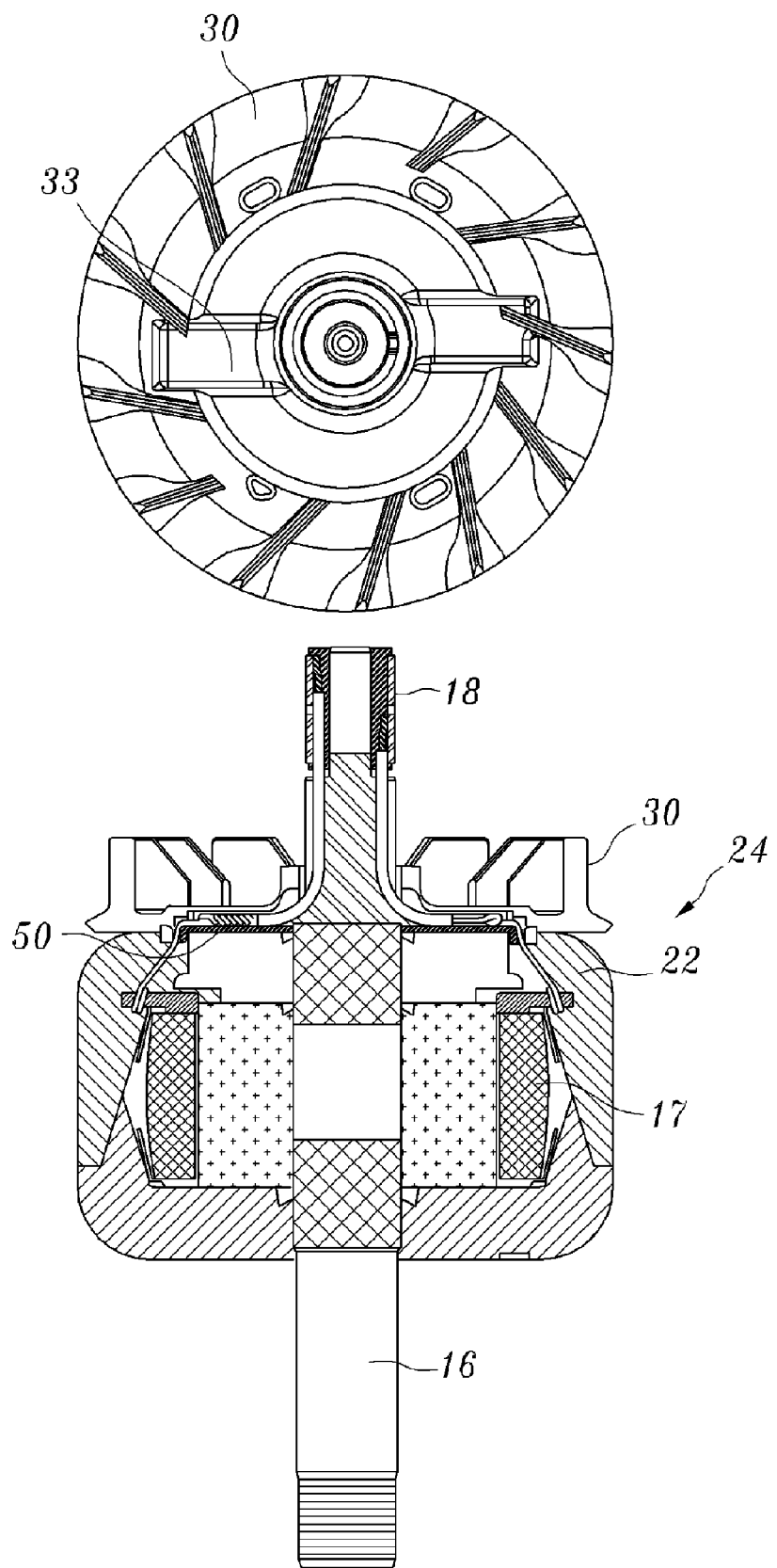
Figure 11:
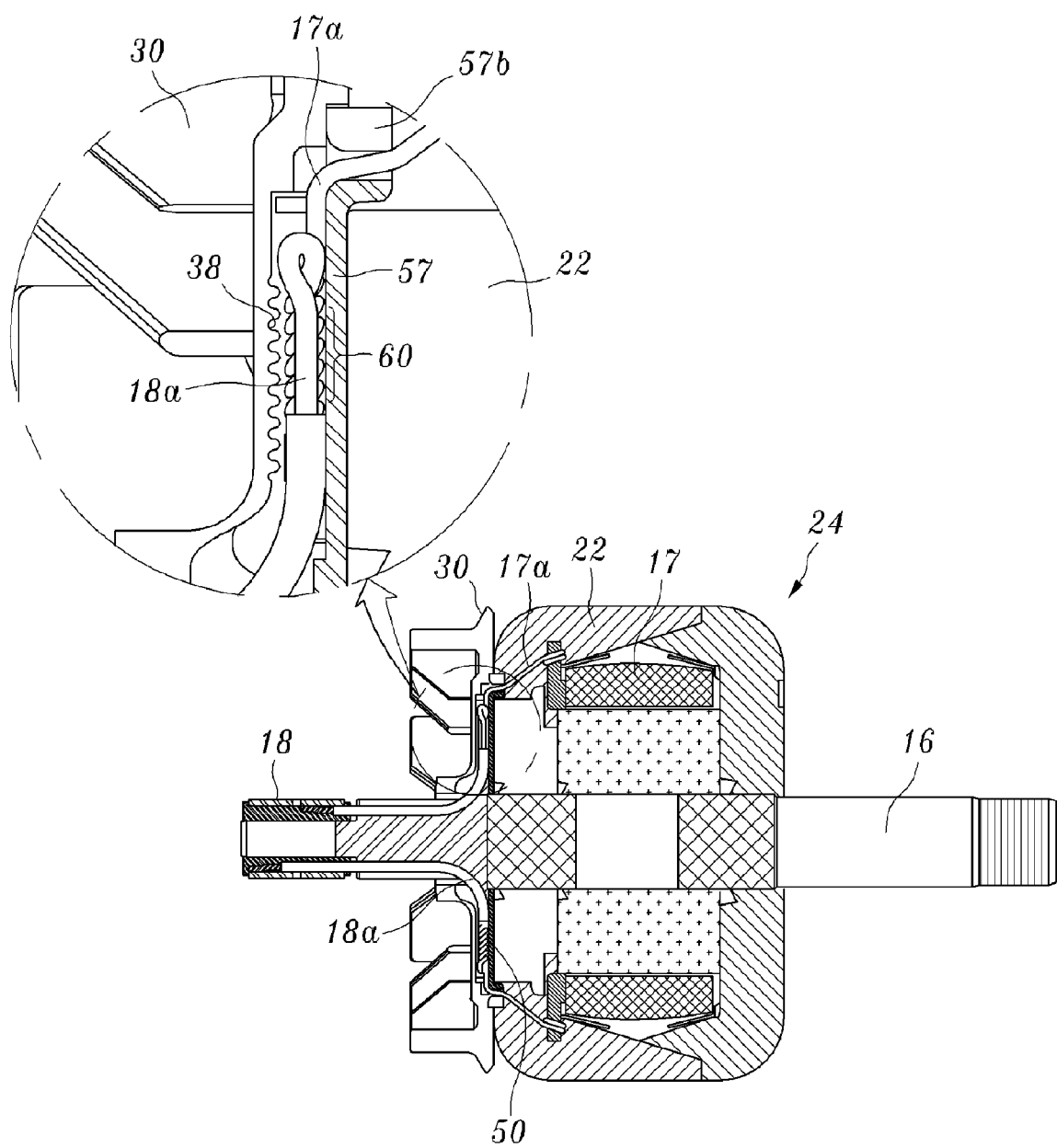
FIG. 11 is a side sectional view and an enlarged view of a principal part of a rotor assembly, which is used to schematically illustrate a rear fan according to a modification of the present invention.
Figure 12:
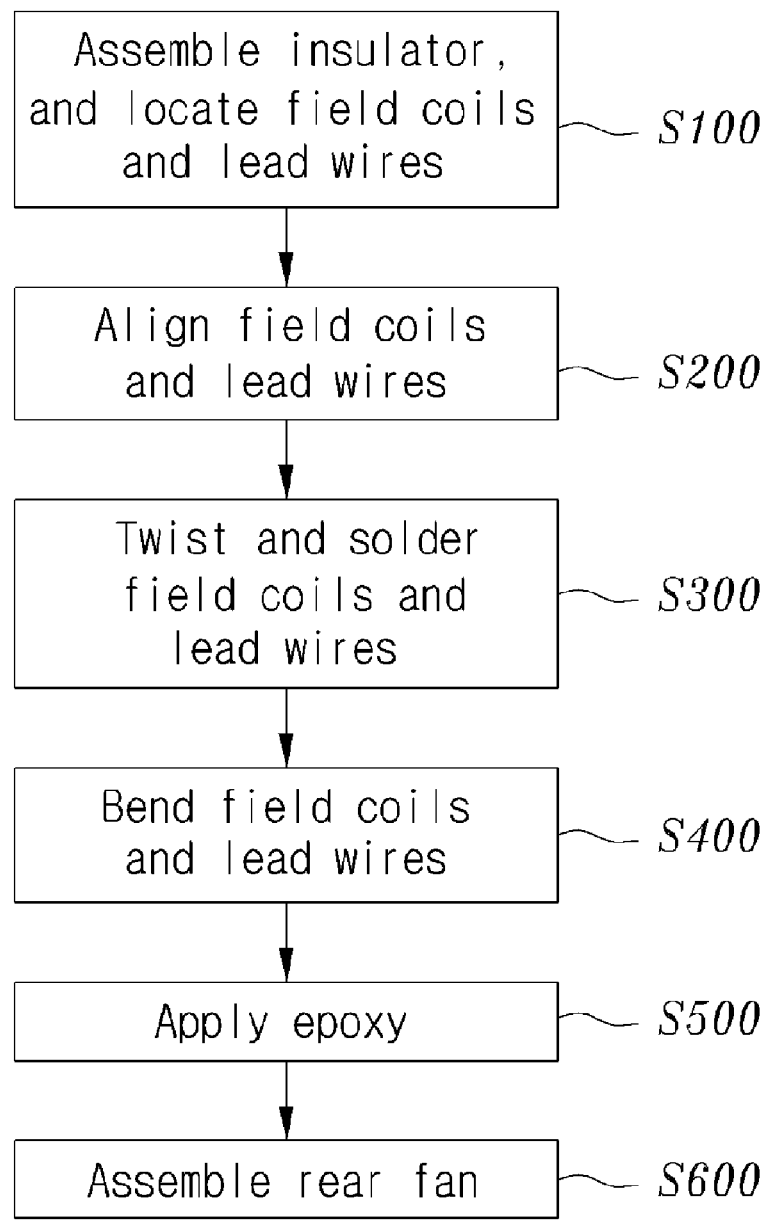
FIG. 12 is a block diagram schematically illustrating a method of connecting field coils and lead wires according to an embodiment of the present invention.

FIG. 4 is a sectional view schematically showing a vehicle alternator according to an embodiment of the present invention, FIG. 5 is a front perspective view schematically showing a rear fan according to an embodiment of the present invention, FIG. 6 is a rear perspective view schematically showing the rear fan according to the embodiment of the present invention, FIG. 7 is a front perspective view schematically showing a rotor insulator according to an embodiment of the present invention, FIG. 8 is a rear perspective view schematically showing the rotor insulator according to the embodiment of the present invention, FIG. 9 is a side sectional view and a front view of a rotor assembly, to which a connection structure between field coils and lead wires according to an embodiment of the present invention is applied, FIGS. 10A to 10F are side sectional views and front view of a rotor assembly, which is used to schematically illustrate a method of connecting field coils and lead wires according to an embodiment of the present invention, FIG. 11 is a side sectional view and an enlarged view of a principal part of a rotor assembly, which is used to schematically illustrate a rear fan according to a modification of the present invention, and FIG. 12 is a block diagram schematically illustrating a method of connecting field coils and lead wires according to an embodiment of the present invention.

As shown in FIG. 4, the vehicle alternator 1 according to an embodiment of the present invention is configured such that a stator assembly 14, which includes a stator core 12 and a stator coil 13, is pressed between a front housing 11 and a rear housing 10 and is fitted thereinto.

Furthermore, a rotor shaft 16, which is supported by bearings 15, which are pressed and are fitted into the front housing 11 and the rear housing 10, is provided inside the stator assembly 14.

The rotor shaft 16 is configured such that a slip ring 18 is coupled to the outer circumferential surface of one end of the rotor shaft 16, and is provided with two guide grooves, which are formed in the outer circumferential surface in the longitudinal direction of the rotor shaft 16 to be opposite each other and to have a predetermined depth, in order to enable lead wires 18a, which are connected with the slip ring 18, to be seated and coupled thereto.

Meanwhile, a spool bobbin 19, which is wound by a rotor coil 17, is pressed and fitted into the middle portion of the rotor shaft 16, and rotor segments 22, each having a plurality of rotor poles 20 arranged in the axial direction, are coupled to each other to contain the spool bobbin 19 outside the spool bobbin 19, and thus a rotor assembly 24 is completed.

That is, the rotor assembly 24 includes the rotor coil 17, the rotor segments 22 and the spool bobbin 19, which are disposed around the rotor shaft 16, and a rear fan 30, which is provided in the rear.

Furthermore, a voltage regulator, which is used to maintain the voltage that is generated from the rotor assembly 24 and the stator assembly 14 constant, and a rectifier 26, which is used to convert AC electricity into DC electricity, are mounted outside the slip ring 18 of the rotor assembly 24.

Furthermore, the SRE of the rotor shaft 16 passes through a through-hole 31, which is formed in the central portion of the rear fan 30, to be located in the central portion of the vehicle alternator 1.

Furthermore, as shown in FIGS. 5 and 6, the rear fan 30 is configured such that two protrusion hubs 33, having a rectangular shape, are formed to have a predetermined length so as to be opposite each other around the through-hole 31. Each of the protrusion hubs 33 is formed to have a hollow therein. Curved coupling depressions 33a are formed such that the field coils 17a, which extend from the rotor coil 17, can be contained and seated in first surfaces of the respective protrusion hubs 33 in the rear thereof. In this case, the protrusion hubs 33 of the rear fan 30 may be modified to protrude to various heights so as to be applied to vehicle alternators having various sizes for use therewith.

Meanwhile, it is further preferred that tapered assembly depressions 31a be formed such that the lead wires 18a can be seated and assembled in the respective inner surfaces of the protrusion hubs 33 of the rear fan 30.

A rotor insulator 50 is coupled to the protrusion hubs 33 in the rear of the rear fan 30. A rear fan support 53, having a doughnut shape, is formed in the central portion of the rotor insulator 50. A through-hole 51 for coupling the rotor shaft 16 is formed in the central portion of the rear fan support 53. Furthermore, coupling parts 57 are integrally formed so as to extend a predetermined length from respective side portions of the rear fan support 53. Second slots 57a for coupling the field coils 17a are formed in respective first ends of the coupling parts 57. Approximately 'ㄷ'shaped guide pockets 55, which protrude to a predetermined height, are integrally formed on the coupling parts 57. First slots 55a for coupling the field coils 17a, which are coupled to the second slots 57a, are formed in respective first edge portions of the guide pockets 55. (Refer to FIGS. 7 and 8)

In this case, the rotor insulator 50 may include rotation preventing parts 57b, having a predetermined height, which are additionally formed to protrude downwards from respective ends of the coupling parts 57 to prevent the rotor insulator 50 from rotating between the plurality of rotor poles 20.

It is preferred that the through-hole 31 in the rear fan 30 and the through-hole 51 in the rear fan support 53 be formed to have the same diameter, so that they can be pressed and mounted to the outer rotor shaft 16.

Accordingly, the connection structure between the field coils 17a and the lead wires 18a in the vehicle alternator 1 according to the embodiment of the present invention is achieved such that the rotor insulator 50 is coupled to the front surface of the rotor segments 22 via the rotor shaft 16, and such that the rear fan 30 is coupled to the front of the rotor insulator 50, as shown in FIG. 9.

In the above-described connection structure between the field coils 17a and the lead wires 18a, twisted parts 60, which are formed by twisting the field coils 17a and the lead wires 18a to respectively correspond to each other, are bent in the guide pockets 55 of the rotor insulator 50 and are fastened thereto through a soldering process.

Furthermore, epoxy is applied to the outer surfaces of the twisted parts 60 and the inner surfaces of the guide pockets 55, and then the rear fan 30 is coupled to the front of the rotor insulator 50, so that the inner surfaces of the protrusion hubs 33 of the rear fan 30 are in close contact with the respective guide pockets 55 of the rotor insulator 50, and thus the case where the epoxy that is applied to the guide pockets 55 falls down before it is hardened can be effectively prevented from occurring.

In this case, the outer surfaces of the twisted parts 60 and the inner surfaces of the guide pockets 55 may be coated with various types of material, in addition to the epoxy.

Meanwhile, the method of connecting field coils and lead wires according to the present invention is described in detail with reference to FIGS. 10A to 10F.

First, as shown in FIG. 10A, the rotor insulator 50 is mounted to be coupled with the rotor shaft 16, which passes therethrough, and to be in close contact with to the upper portions of the rotor segments 22 of the rotor assembly 24. That is, an insulator assembling and field coil and lead wire locating step S100 of assembling the rotor insulator 50, locating the field coils 17a, which extend from the rotor coil 17 and have a sufficient length, in the axial direction, and locating the lead wires 18a, which are connected to the slip ring 18 coupled to the upper end of the rotor shaft 16, parallel to the field coils 17a, which are longer than the lead wires 18a, is performed (refer to FIG. 12).

Furthermore, as shown in FIGS. 10B and 10C, a field coil and lead wire aligning step S200 of bringing the field coils 17a into contact with the respective lead wires 18a and aligning them is performed (refer to FIG. 10B). Subsequently, a field coil and lead wire twisting and soldering step S300 of forming the twisted parts 60 by twisting the field coils 17a and the lead wire 18a around each other, that is, using a twisting process, appropriately cutting the twisted parts 60 to have lengths such that the ends of the twisted parts 60 can be contained in the respective guide pockets 55 of the rotor insulator 50, and performing a soldering process on the outer surfaces of the twisted parts 60 is performed (refer to FIG. 10c).

In this case, when the step S300 is performed, a welding process, in addition to the soldering process, may be used to securely fasten the twisted parts 60, which are formed on the field coils 17a and the lead wires 18a.

Thereafter, as shown in FIGS. 10D and 10E, a field coil bending step S400 of putting the twisted parts 60 in the guide pockets 55 of the rotor insulator 50 and fastening the twisted parts 60 thereto through a bending process is performed (refer to FIG. 10D). Subsequently, an epoxy coating step S500 of applying an epoxy coating process to the guide pockets 55 so that the outer surfaces of the twisted parts 60, on which the soldering process is performed, and the inner surfaces of the guide pockets 55 are coated with epoxy is performed (FIG. 10E).

Finally, as shown in FIG. 10F, a rear fan assembling step S600 of performing assembly in such a way as to bring the rear fan 30 into close contact with the upper portion of the rotor insulator 50 before the epoxy, which is applied to the inner surfaces of the guide pockets 55 and the outer surfaces of the twisted parts 60, is hardened is performed.

In this case, when the step S600 is performed, assembly is performed such that the rotor insulator 50 is inserted into the protrusion hubs 33 of the rear fan 30 to be in close contact with the inner surfaces thereof.

Accordingly, when the epoxy is hardened after the lead wires 18a and the field coils 17a are connected and contained between the protrusion hubs 33 of the rear fan 30 and the guide pockets 55 of the rotor insulator 50, they are very effectively fastened to the lower portion of the rear fan 30, and thus electrical coupling is achieved.

As described above, a conventional process of assembling an insulator tube to the field coils 17a can be eliminated, so that the work process is simplified, and thus the costs can be reduced.

Furthermore, the soldering or welding process, the bending process and the epoxy coating process can be performed on the twisted parts 60, which are formed on the field coils 17a and the lead wire 18a, in the guide pockets 55 of the rotor insulator 50 without interfering with neighboring protrusions, and thus the defect rate attributable to the simplification of the work process can be minimized.

Meanwhile, as shown in FIG. 11, when a plurality of protrusions is additionally formed on the inner surface of each protrusion hub 33 of the rear fan 30, the pressure is applied to the twisted parts 60, so that the connection structure between the field coils 17a and the lead wires 18a is further securely fastened and supported. In addition, when the epoxy is hardened, the connection structure between the field coils 17a and the lead wires 18a is brought into close contact with the plurality of protrusions, so that the contact area is increased, and thus resistance to vibration, which occurs when the alternator is rotated at high speed, can be improved.

As described above, in the connection structure and method of connecting field coils and lead wires in a vehicle alternator and the connection method, the field coils and the lead wires can be coupled to be very securely fastened and supported in the guide pockets of the insulator through the soldering or welding process, the bending process and the epoxy coating process without interfering with neighboring protrusions, the defect rate attributable to the simplification of the work process can be minimized, and corrosion, attributable to the exposure of the field coil, can be prevented from occurring because the field coil and the lead wires are connected in the protrusion hubs of the rear fan.

Furthermore, the plurality of protrusions is additionally formed on the inner surface of each protrusion hub of the rear fan, and thus the connection structure between the field coils and the lead wires is further securely fastened and supported. In addition, when the epoxy is hardened, the connection structure between the field coils and the lead wires is brought into close contact with the plurality of protrusions, so that the contact area is increased, and thus resistance to vibration, which occurs when the alternator is rotated at high speed, can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A connection structure between field coils and lead wires in a vehicle alternator, comprising:
   a rotor assembly, comprising: a rotor shaft, which is configured such that a slip ring is coupled to an outer circumferential surface of one end thereof and is provided with two guide grooves, which are formed in the outer circumferential surface in a longitudinal direction of the rotor shaft to be opposite each other and to have a predetermined depth, in order to enable lead wires, which are connected with the slip ring, to be seated and coupled thereto; a spool bobbin, which is wound by a rotor coil and is pressed and fitted into a middle portion of the rotor shaft; and rotor segments, each having a plurality of rotor poles 20 arranged in an axial direction, which are coupled to each other outside the spool bobbin to contain the spool bobbin;

a rear fan provided with a through-hole for connecting the rotor shaft, two protrusion hubs, having a rectangular shape, which are formed to have a predetermined length so as to be opposite each other around the through-hole, wherein a hollow is formed in each of the protrusion hubs; and a rotor insulator configured such that a rear fan support, having a doughnut shape, is formed in a central portion thereof so as to be coupled to the protrusion hubs downstream of the rear fan, a through-hole for connecting the rotor shaft is formed in a central portion of the rear fan support, coupling parts are integrally formed so as to extend a predetermined length from respective side portions of the rear fan support, second slots for coupling the field coils are formed in respective first ends of the coupling parts, 'ㄷ' shaped guide pockets, which protrude to a predetermined height, are integrally formed on the coupling parts, and first slots for coupling the field coils, which are coupled to the second slots, are formed in respective first edge portions of the guide pockets;

wherein a soldering or welding process is performed on twisted parts, which are formed by twisting the field coils and the lead wires around each other, the twisted parts are bent in the guide pockets of the rotor insulator, epoxy is applied to outer surfaces of the twisted parts and inner surfaces of the guide pockets, and the rear fan is coupled to a front of the rotor insulator so that inner surfaces of the protrusion hubs of the rear fan are in close contact with the guide pockets of the rotor insulator.

2. The connection structure as set forth in claim 1, wherein the through-hole in the rear fan and the through hole in the rear fan support have identical diameters.

3. The connection structure as set forth in claim 1, wherein the rotor insulator comprises rotation preventing parts, having a predetermined height, which are formed to protrude downwards from respective ends of the coupling parts to prevent the rotor insulator from rotating between the plurality of rotor poles.

4. The connection structure as set forth in claim 1, further comprising:
    tapered assembly depressions formed such that the lead wires can be seated and assembled in the respective inner surfaces of the protrusion hubs of the rear fan.

5. The connection structure as set forth in claim 1, further comprising:
    curved coupling depressions formed such that the field coils are seated and assembled in the protrusion hubs of the rear fan.

6. The connection structure as set forth in claim 1, further comprising:
    a plurality of protrusions formed on each of the inner surfaces of the protrusion hubs of the rear fan.

* * * * *